United States Patent
Chouk et al.

(10) Patent No.: US 10,044,316 B2
(45) Date of Patent: Aug. 7, 2018

(54) METHOD AND DEVICE FOR OPERATING AN ELECTRIC MACHINE, AND MOTOR VEHICLE

(71) Applicant: Robert Bosch GmbH, Stuttgart (DE)

(72) Inventors: Lanouar Chouk, Guendelbach (DE); Gunther Goetting, Stuttgart (DE); Raimundo Varas Manso, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/549,614

(22) PCT Filed: Dec. 30, 2015

(86) PCT No.: PCT/EP2015/081435
§ 371 (c)(1),
(2) Date: Aug. 8, 2017

(87) PCT Pub. No.: WO2016/128100
PCT Pub. Date: Aug. 18, 2016

(65) Prior Publication Data
US 2018/0034407 A1    Feb. 1, 2018

(30) Foreign Application Priority Data
Feb. 10, 2015   (DE) .................. 10 2015 202 305

(51) Int. Cl.
*H02P 23/00*   (2016.01)
*H02P 25/12*   (2006.01)
(Continued)

(52) U.S. Cl.
CPC .............. *H02P 29/64* (2016.02); *B60L 11/02* (2013.01)

(58) Field of Classification Search
CPC .................................. H02P 25/024; H02P 6/28
See application file for complete search history.

(56) References Cited

U.S. PATENT DOCUMENTS

2011/0015881 A1   1/2011  Chen et al.
2012/0242272 A1*  9/2012  Yamada ................ H02P 25/024
                                                                318/718

FOREIGN PATENT DOCUMENTS

DE   102005037717   12/2006
DE   102013201344   7/2014
(Continued)

OTHER PUBLICATIONS

International Search Report for Application No. PCT/EP2015/081435 dated Apr. 29, 2016 (English Translation, 3 pages).

*Primary Examiner* — Bentsu Ro
*Assistant Examiner* — Cortez Cook
(74) *Attorney, Agent, or Firm* — Michael Best & Friedrich LLP

(57) ABSTRACT

The invention relates to a method for operating an electric machine (4), in particular of a motor vehicle (1), having a stator (10) with at least one stator coil. The stator coil is energized in order to set a required torque of the electric machine (4), and a temperature of the stator (10) of the electric machine (4) is detected by means of a temperature sensor (12). The current flowing through the stator coil is monitored in order to plausibility-check the detected temperature. In order to plausibility-check the temperature, the current in the stator coil is increased while maintaining the same torque, and the temperature is monitored for a temperature increase.

12 Claims, 1 Drawing Sheet

(51) Int. Cl.
*H02P 29/64* (2016.01)
*B60L 11/02* (2006.01)

(56) References Cited

FOREIGN PATENT DOCUMENTS

| | | | | |
|---|---|---|---|---|
| EP | 1136800 | | 9/2001 | |
| EP | 1136800 | A1 * | 9/2001 | ........... B62D 5/0496 |

* cited by examiner

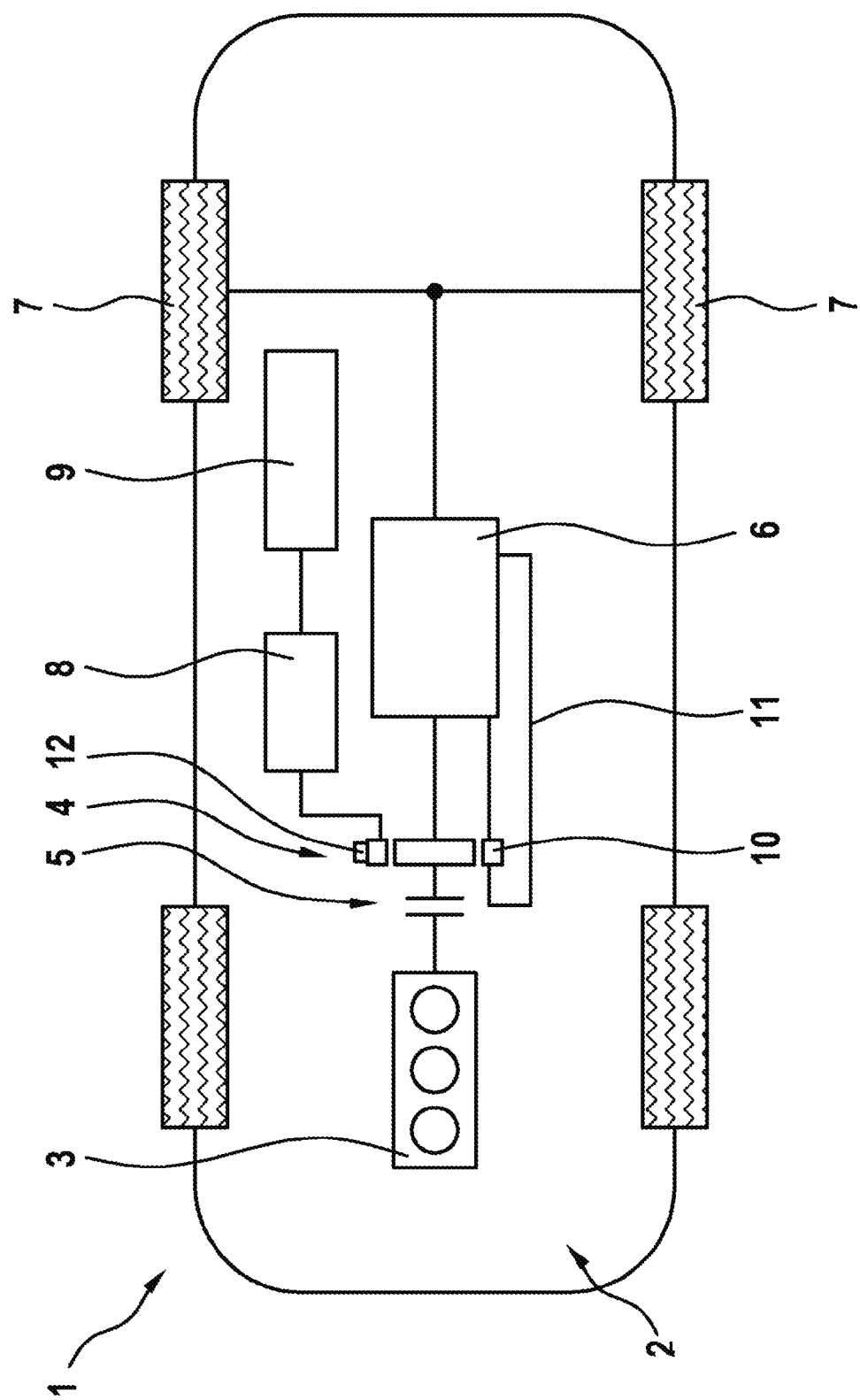

METHOD AND DEVICE FOR OPERATING AN ELECTRIC MACHINE, AND MOTOR VEHICLE

BACKGROUND OF THE INVENTION

The present invention relates to a method and a device for operating an electric machine, in particular of a motor vehicle, said electric machine having a stator with at least one stator winding, wherein the stator winding is supplied with current for setting a demanded torque of the electric machine, wherein a temperature of the stator of the electric machine is detected by means of a temperature sensor, and wherein the current flowing through the stator winding is monitored for performing a plausibility check on the detected temperature.

Furthermore, the present invention relates to a motor vehicle including an electric machine and a device of the aforementioned kind.

Electric machines are increasingly being integrated into the drive train of motor vehicles, in order to generate a drive torque alone or in combination with a conventional internal combustion engine. High demands are being made on the available continuous and peak output of the electric machines, during generator operation as well as during motor operation. The efficiency of the electric drive is also relevant. Generally, the electric drive is operated in a torque control mode, so that a stator winding of the electric machine is supplied with current as a function of a torque demanded of the electric machine. The current which is required for setting the demanded torque is determined as a function of the operating point, via current control.

To monitor the thermal behavior of the electric machine, it is known to provide a temperature sensor which detects the temperature of the stator. Since this is a safety-critical measured variable, it is known to perform a plausibility check on it periodically. For this purpose, the physical relationship between the energy which is introduced into the stator and which is a function of the current flowing through the stator, and the thermal behavior of the stator, is used. If the detected temperature does not change in the case of a significant increase in the introduced energy, the temperature sensor is diagnosed as being defective.

SUMMARY OF THE INVENTION

The method according to the present invention has the advantage that performing the plausibility check on the temperature sensor may be carried out at almost any time, in particular independently of the operation of the electric machine. In particular, it is not necessary to await operating points at which large currents flowing through the stator over a longer period ensure a level of heat introduction which is sufficiently high to result in a temperature change. For this purpose, it is provided according to the present invention that for performing a plausibility check, the current in the stator winding is increased while maintaining constant torque of the electric machine, and the temperature is monitored for a temperature increase. According to the present invention, it is thus provided that the energy introduced into the stator winding or into the stator is increased, but the torque of the electric machine is maintained. This may take place via a change in the operating point of the electric machine, whereby the electric machine, for example, is shifted to a lower level of efficiency. The energy introduced into the stator is increased in a simple manner via the current increase, so that the probability that the stator is heated is increased. It is thus possible to perform the diagnosis at any time, without the driver of the vehicle, for example, having to forgo a demanded torque.

According to one advantageous refinement of the present invention, it is provided that fault-free operation of the temperature sensor is identified if a temperature increase is detected which is caused by the current increase. Thus, if the temperature sensor detects a temperature increase when or after the current flowing through the stator has been increased, it may thus be identified or diagnosed that the temperature sensor functions correctly.

According to one advantageous refinement of the present invention, it is provided that an integral of the current flowing in the stator winding and a temperature change detected by the temperature sensor are ascertained and compared for performing the plausibility check. The integral of the current flowing through the stator winding represents the energy introduced into the stator, which may then be compared to the temperature change in order to indicate the functionality of the temperature sensor.

Preferably, it is provided that the plausibility check is carried out in a diagnosis time window, and that the current is increased only if it is ascertained, or if it is probable, that the current increase within the active diagnosis time window may result in, or results in, a temperature increase which is measurable via the temperature sensor. Generally, diagnosis time windows are provided when performing a plausibility check on the temperature sensor, so that the plausibility check is carried out periodically. Via the preferred embodiment, it is ensured that a current increase does not take place if this current increase does not or would not result in a temperature increase within the diagnosis time window. This would in fact represent a useless expenditure of energy.

Furthermore, it is preferably provided that the ascertainment is carried out as a function of an instantaneous current value in the stator winding. In this case, it is in particular taken into account that if a maximum torque of the electric machine is demanded as a result of the instantaneous current value, an increase in the current value would not be possible or might be not be sufficient for causing a measurable temperature increase while maintaining constant torque.

Furthermore, it is preferably provided that the ascertainment is carried out as a function of a temperature of a coolant which is supplied or suppliable to the stator. In this case, in particular the difference between the temperature source (stator) and the temperature sink (coolant) is taken into account. The greater the difference is, the greater the energy output must be in order to result in heating of the stator.

The device according to the present invention is characterized by a control device which carries out the method according to the present invention. The aforementioned advantages thus result.

The motor vehicle according to the present invention is characterized by the device according to the present invention, whereby the aforementioned advantages result. Additional features and advantages result from the previous description and from the claims.

BRIEF DESCRIPTION OF THE DRAWINGS

The invention is to be described in greater detail below based on the drawing. For this purpose, FIG. 1 shows a simplified depiction of a motor vehicle.

DETAILED DESCRIPTION

FIG. 1 shows a simplified top view of a motor vehicle 1 having a drive device 2 which is formed from an internal combustion engine 3 and an electric machine 4. The internal combustion engine 3 is operatively connectable to the electric machine 4 via an actuatable clutch 5. The electric machine 4 is connected to a transmission 6 which is connected on the output side to the drive wheels 7 of the motor vehicle.

Furthermore, the motor vehicle 1 has a control device 8 which is connected to the electric machine 4 and an electrical store 9, in order to operate the electric machine 4 as a motor or as a generator. For this purpose, the control unit 8 is connected to the stator 10 of the electric machine 4, said stator having at least one stator winding which is supplied with current as needed via the control device 8, in order to set a torque of the electric machine 4. In addition, the control device 8 is also connected to the internal combustion engine 3 or to an engine control device associated with the internal combustion engine 3, in order to control the overall operation of the drive device 2. In addition, a cooling circuit 11 is associated with the stator 4 and runs in particular from a bottom pan of the transmission 6 through the stator 10 and back into the transmission 6. The cooling circuit 11 in particular has a pump which is not depicted here, by means of which the coolant, in particular transmission oil, may be conveyed as needed.

In order to ensure safe operation of the electric machine 4, the instantaneous temperature of the stator 10 is monitored by means of a temperature sensor 12. The data of the temperature sensor 12 are evaluated by the control device 8. In order to perform a plausibility check on the functionality or on the values supplied by the temperature sensor 12, it is provided that the physical relationship between the energy which is introduced into the stator 10 and which corresponds to an integral of the current flowing in the starter winding or in the starter windings, and a temperature change in the stator 4, is used. If the temperature signal or the detected temperature does not change or has not changed in the case of a significant magnitude of the current integral, it is thus identified that the temperature sensor 4 is defective. In order to be able to perform a plausibility check on the values of the temperature sensor 12, an expected temperature range is generally provided via a suitable estimation model. In this case, in addition to the heat introduced into the stator winding via the current, heat transport between the rotor and the stator and through the cooling circuit 11 is also to be taken into account. Since this heat transport generally cannot be determined exactly, for example, because the cooling capacity varies, the accuracy provided by the estimation model is reduced. In order still to ensure a more reliable diagnosis or plausibility check on the temperature sensor 12, the diagnosis is generally carried out only if large currents flow in the stator 10 over a longer period, thus ensuring a correspondingly high level of heat introduction. However, many vehicles rarely achieve this state. As a result, the diagnosis is performed or may be performed only rarely.

Advantageously, it is therefore provided that the current in the stator winding of the stator 10 is increased via the control device 8 while maintaining constant torque of the electric machine 4, in order to increase the heat introduction into the stator 10 as needed for the diagnosis. It is thus ensured that this occurs only if there is the expectation of successfully performing the diagnosis under the instantaneous boundary conditions. In this case, the increase in the stator current or the stator currents is achieved by shifting the operating point while maintaining the demanded torque. Via the additional heating of the stator 10, an increase in the frequency of diagnosis is thus achieved, wherein the torque of the electric machine 4, or a drive torque desired by a driver of the motor vehicle 1, simultaneously continues to be maintained, so that only a small influence, or no influence at all, is exerted on the normal driving operation, wherein, as a result of the shift in the operating point, the electrical range of the motor vehicle 1 is maintained only for the diagnostic operation, in particular only with the expectation of a successful diagnostic result.

The diagnosis, which monitors the periodic updating of the temperature of the stator 4 detected by the temperature sensor 12, wherein corresponding diagnosis windows result, takes into account both the integral of the current flowing in the stator 10 and the temperature change in the same diagnosis time window. In the diagnosis time window, the control device 8 preferably continuously calculates, at a rather late instant, the additional current demand which is necessary to reach the required value of the current integral or the electric charge within the diagnosis time window which is necessary to increase the temperature of the stator 4. The additional current demand is converted into a shift in the operating point via the setpoint values of the current control, if an expectation exists that the energy introduction into the stator 4 is achieved within the diagnosis time window via the additional increase in current, so that the additional heating of the stator 4 also is detectable within the time window by means of the temperature sensor 12. Due to the additional current, the temperature deviation becomes greater, whereby the robustness and the frequency of the diagnosis are increased.

In particular, it is provided that a minimum amount of energy is initially ascertained which must be introduced into the stator in order to enable the temperature deviation. For this purpose, the maximum providable current is ascertained. This current is, for example, a function of the charge state of the electric store 9. If it is detected that the maximum providable current would not be sufficient to ensure a sufficiently high temperature deviation which could be detected by the temperature sensor 12, this diagnosis is terminated.

Furthermore, it is advantageously provided that a temperature difference between the stator and the cooling circuit 11 is ascertained or at least estimated, wherein, if a large temperature difference exists, the diagnosis is then performed only if a high current is provided, and in the case of a small temperature difference, the diagnosis is also performed if only a small increased current value is provided which is able to contribute to the heating of the stator. In particular, for determining the temperature difference, the stator temperature which is detected by the temperature sensor 12 is compared to a temperature of the lubricant, in particular of the oil, in the bottom pan of the transmission 6.

Furthermore, a maximum current is determined, which must not be exceeded during the current increase, in order to ensure that the temperature sensor 12 and/or the stator 4 are able to be sufficiently cooled by the cooling circuit 11, so that damage to the electric machine 4 due to the diagnosis is prevented. This value is also determined in particular as a function of the aforementioned temperature difference.

The invention claimed is:

1. A method for operating an electric machine (4), said electric machine having a stator (10) with at least one stator winding, the method comprising
supplying the stator winding with current for setting a demanded torque of the electric machine (4),
detecting a temperature of the stator (10) of the electric machine (4) by means of a temperature sensor (12), and
monitoring the current flowing through the stator winding for performing a plausibility check on the detected temperature, wherein for performing the plausibility check, the current in the stator winding is increased while maintaining constant torque, and the temperature is monitored for a temperature increase.

2. The method as claimed in claim 1, characterized in that fault-free operation of the temperature sensor (12) is identified if a temperature increase is detected which is caused by the current increase.

3. The method as claimed in claim 1, characterized in that an integral of the current flowing in the stator winding and a temperature change detected by the temperature sensor (12) are ascertained and compared for performing the plausibility check.

4. The method as claimed in claim 1, characterized in that the plausibility check is carried out in a diagnosis time window, wherein the current is increased only if it is ascertained that the current increase within the active diagnosis time window results in a temperature increase which is measurable via the temperature sensor (12).

5. The method as claimed in claim 1, characterized in that the ascertainment is carried out as a function of an instantaneous current value and/or a maximum available current value.

6. The method as claimed in claim 1, characterized in that the ascertainment is carried out as a function of a temperature of a coolant which is suppliable/supplied to the stator (10).

7. A device for operating an electric machine (4) of a motor vehicle (1), the electric machine having a stator with at least one stator winding and a temperature sensor (12), the device comprising a control device (8) which supplies the stator winding of the electric machine (4) with current as a function of a demanded torque, detects a temperature of the stator (10) by means of the temperature sensor (12), and monitors the current flowing through the stator winding for performing a plausibility check on the detected temperature, characterized in that the control device (8) is configured to carry out the method according to claim 1.

8. A motor vehicle (1) including an electric machine (4) and including a device as claimed in claim 7.

9. The method as claimed in claim 2, characterized in that an integral of the current flowing in the stator winding and a temperature change detected by the temperature sensor (12) are ascertained and compared for performing the plausibility check.

10. The method as claimed in claim 9, characterized in that the plausibility check is carried out in a diagnosis time window, wherein the current is increased only if it is ascertained that the current increase within the active diagnosis time window results in a temperature increase which is measurable via the temperature sensor (12).

11. The method as claimed in claim 10, characterized in that the ascertainment is carried out as a function of an instantaneous current value and/or a maximum available current value.

12. The method as claimed in claim 11, characterized in that the ascertainment is carried out as a function of a temperature of a coolant which is suppliable/supplied to the stator (10).

* * * * *